(12) United States Patent
Kupper

(10) Patent No.: US 9,371,252 B2
(45) Date of Patent: Jun. 21, 2016

(54) DEVICE AND SYSTEM FOR PRODUCING CEMENT CLINKER

(71) Applicant: Detlev Kupper, Telgte (DE)

(72) Inventor: Detlev Kupper, Telgte (DE)

(73) Assignee: ThyssenKrupp Industrial Solutions AG (DE)

( * ) Notice: Subject to any disclaimer, the term of this patent is extended or adjusted under 35 U.S.C. 154(b) by 0 days.

(21) Appl. No.: 14/507,917

(22) Filed: Oct. 7, 2014

(65) Prior Publication Data

US 2015/0037745 A1  Feb. 5, 2015

Related U.S. Application Data

(62) Division of application No. 13/063,813, filed as application No. PCT/EP2009/063676 on Oct. 24, 2009, now Pat. No. 8,876,970.

(30) Foreign Application Priority Data

Oct. 24, 2008 (DE) .......................... 10 2008 053 135

(51) Int. Cl.
*F27B 7/20* (2006.01)
*F27D 17/00* (2006.01)
*C04B 2/10* (2006.01)
(Continued)

(52) U.S. Cl.
CPC ................ *C04B 2/106* (2013.01); *C04B 7/367* (2013.01); *C04B 7/432* (2013.01); *C04B 7/434* (2013.01); *C04B 7/436* (2013.01); *C04B 7/45* (2013.01); *F27B 7/2033* (2013.01);
(Continued)

(58) Field of Classification Search
None
See application file for complete search history.

(56) References Cited

U.S. PATENT DOCUMENTS 3,873,331 A * 3/1975 Kondo .................... C04B 7/434
106/744
3,895,955 A * 7/1975 Kondo .................... C04B 7/434
106/744
(Continued)

FOREIGN PATENT DOCUMENTS

DE  19637320  3/1998
EP  0 059 508 A  9/1982
(Continued)

OTHER PUBLICATIONS

Gnosh, S.N. "Advances in Cement Technology: Chemistry, Manufacture, and Testing" Tech Books International, pp. 331-312 (2002), Retrieved from http://books.google.com/books?id=46lg6WxeUcUC&pg=PA311&dq=fluidized+bed+calciner+and+cement&source=bl&ots=5tyy0NCnd&sig=oQI7cZGGzVFfzeFIBcmR0o5vyVM&hl=en&sa=X&ei=Fg6tUsIDaersQ.
(Continued)

*Primary Examiner* — Kaj K Olsen
*Assistant Examiner* — Karam Hijji
(74) *Attorney, Agent, or Firm* — Renner Kenner Greive Bobak Taylor & Weber

(57) ABSTRACT

In the method according to the invention for producing cement clinker, raw cement meal is preheated in a preheater, the preheated raw cement meal is precalcined in a calciner and the precalcined raw cement meal is burnt in a kiln, fuel and combustion air having an oxygen content of at least 75 mol % being used in the calciner, and the raw cement meal being precalcined in a fluidized bed in the calciner. The exhaust gases occurring in the kiln are delivered to the preheater, bypassing the calciner, and the exhaust gases of the calciner are delivered to a $CO_2$ preparation device.

7 Claims, 4 Drawing Sheets

(51) Int. Cl.
*C04B 7/36* (2006.01)
*C04B 7/43* (2006.01)
*C04B 7/45* (2006.01)

(52) U.S. Cl.
CPC ............ *F27D 17/008* (2013.01); *Y02P 40/121* (2015.11); *Y02P 40/18* (2015.11)

(56) References Cited

U.S. PATENT DOCUMENTS

| | | | |
|---|---|---|---|
| 4,226,830 A * | 10/1980 | Davis | B01J 8/1818 110/245 |
| 4,402,754 A | 9/1983 | Schmidt et al. | |
| 4,425,163 A | 1/1984 | Schmidt et al. | |
| 4,664,625 A | 5/1987 | Desmidt | |
| 6,012,918 A | 1/2000 | Doumet | |
| 8,187,374 B2 | 5/2012 | Penfornis et al. | |
| 2010/0000446 A1 | 1/2010 | Penfornis | |
| 2011/0044880 A1 * | 2/2011 | Shima | C04B 7/367 423/437.1 |

FOREIGN PATENT DOCUMENTS

| | | |
|---|---|---|
| EP | 0 059 509 A | 9/1982 |
| WO | 2008056068 A1 | 5/2008 |
| WO | 2008059378 A2 | 5/2008 |

OTHER PUBLICATIONS

Kunii, et al. "Fluidization Engineering" Butterworth-Heinemann, p. 50 (1991).

"Workshop on Carbon Dioxide Capture and Storage" Intergovernmental Panel on Climate Change, Nov. 2002, Retrieved from http://www.climatescience.gov/Library/ipcc/ccs02-workshop_proceedings.pdf (Retrieved on May 30, 2013).

* cited by examiner

DEVICE AND SYSTEM FOR PRODUCING CEMENT CLINKER

CROSS-REFERENCE TO RELATED APPLICATIONS

The present invention is a Divisional of U.S. patent application Ser. No. 13/063,813, filed Mar. 14, 2011, which is a National Phase filing of International Application No. PCT/EP2009/063676, filed Oct. 24, 2009, which claims priority to German Application No. DE 102008053135.9, Oct. 24, 2008, all incorporated herein by reference.

TECHNICAL FIELD

The invention relates to a method and a system for producing cement clinker, raw meal being preheated, calcined and subsequently burnt in a kiln to form cement clinker.

BACKGROUND OF THE INVENTION

In the production of cement clinker, approximately 0.53 t $CO_2$/t clinker results from the deacidification of the limestone and approximately 0.28 t $CO_2$/t clinker from the combustion of fuel in the burning process. Those quantities of carbon dioxide (0.81 t $CO_2$/t clinker) have hitherto been emitted into the atmosphere by way of the exhaust gas, although the effect of carbon dioxide as a greenhouse gas is generally known. Efforts are therefore being made to reduce emissions drastically in future.

Against that background, methods that permit separation of $CO_2$ from the exhaust gases of combustion processes are currently being discussed.

DE 196 37 320 A1 discloses a method for producing cement in which the raw meal is preheated, calcined and finally burnt in a rotary tubular kiln. In that method, the raw meal is deacidified in a calciner through which kiln exhaust gas flows. The calciner operates in accordance with the entrained flow principle. Before being charged into the rotary tubular kiln, the calcined raw meal is delivered to a suspension reactor having a circulating fluidised bed. The fluidised bed is formed with heated air in which the calcined material is heated to temperatures of from 1000 to 1200° C., so that impurities are expelled.

In order to reduce $CO_2$ emissions, in particular the so-called oxyfuel process is of interest for cement production. In that process, the fuel is reacted with almost pure oxygen, so that the exhaust combustion gas does not contain nitrogen and consists almost entirely of $CO_2$ and water.

WO 2008/059378 describes such a method in which the exhaust gas of the calciner is concentrated with regard to the $CO_2$ content to such an extent that it can be delivered to a storage stage. Thus, approximately 75% of the carbon dioxide generated during clinker burning can be separated off, without the need for any appreciable modifications to the clinker production process. The calciners used, as also in WO 2008/059378, are usually so-called entrained flow calciners, in the case of which the raw meal to be treated is transported by a carrier gas (usually the exhaust gas of the kiln or tertiary air) through the calciner, while the heat treatment takes place. If, however, the calciner is no longer operated with the kiln exhaust gas or the tertiary air of the cooler, but with oxygen, the amount of exhaust gas is greatly reduced. In WO 2008/059378, that problem is solved by raising the quantity of carrier gas by returning the exhaust gases of the calciner. Owing to the high gas temperatures of the recirculated exhaust gas, it is necessary, for the operation of a fluid-flow machine (fan), for the gas to be cooled by means of heat exchangers or to be quenched with a gas of lower temperature, as proposed in WO 2008/059378. As a result of the recirculation of some of the exhaust gases of the calciner, local over-heating in the oxygen-operated calciner can also be avoided.

Recirculation has, however, the disadvantage of recarbonation, that is to say, the re-formation of $CaCO_3$ from CaO and $CO_2$. Owing to the high $CO_2$ partial pressure in the oxyfuel process, recarbonation takes place at a high reaction rate when a cooling of the material to be burnt to temperatures below the equilibrium temperature of approximately 850° C. takes place. For the process, that operation results in an increased thermal energy requirement for the calciner since the recarbonated material has to be deacidified again.

SUMMARY OF THE INVENTION

The object of the invention is therefore to provide the method and the system for producing cement clinker in the case of application of the oxyfuel process in the calciner, the method and the system being distinguished by a lower energy requirement.

According to the invention, that object is achieved by the features of claim 1.

In the method according to the invention for producing cement clinker, raw cement meal is preheated in a preheater, the preheated raw cement meal is precalcined in a calciner and the precalcined raw cement meal is burnt in a kiln, fuel and combustion air having an oxygen content of at least 75 mol % being used in the calciner and the raw cement meal being precalcined in a fluidised bed in the calciner. The exhaust gases occurring in the kiln are delivered to the preheater, bypassing the calciner, and the exhaust gases of the calciner are delivered to a $CO_2$ preparation device.

The system according to the invention is developed for performing the above method.

Although consideration has previously been given to constructing calciners in the form of fluidised bed reactors, that type of calciner has not achieved significance in practice since, owing to the necessary quantity of combustion air, the calciners would have to be dimensioned to be so large that economical precalcining would not be possible.

The combination of the oxyfuel process and a calciner constructed in the form of a fluidised bed reactor, however, now permits an ideal, mutually complementing combination of two measures known per se. Owing to the use of combustion air having a high oxygen content of at least 75% (preferably at least 90%), the amount of gas required for combustion is substantially reduced. Consequently, the fluidised bed reactor can be constructed to be smaller by a factor of 4 to 5 than a fluidised bed reactor operated with conventional combustion air. The fluidised bed reactor also has the advantage that it can operate with a substantially smaller amount of carrier gas compared with an entrained flow reactor. The situation is even such that the combustion air required for combustion in the fluidised bed reactor is at the same time also sufficient for building up the fluidised bed. Recirculation of the exhaust gas of the calciner will therefore not be necessary at all, or will be necessary only to a very slight extent.

Owing to the combination according to the invention, the problem of recarbonation can therefore be avoided. The fluidised bed reactor also has the advantage that it has an extremely uniform temperature distribution, so that local temperature peaks can be avoided in the calciner even without recirculation of the exhaust gases.

Further configurations of the invention are the subject-matter of the subordinate claims.

According to a preferred configuration of the invention, the calciner has means for removing the precalcined raw cement meal which are arranged below the expansion point of the fluidised bed and are connected to the kiln. The fluidised bed is preferably operated in such a manner that it is in a stationary state and not in a circulating state, that is to say, flow through the fluidised bed reactor occurs at rates which are markedly below the discharge rate for the precalcined raw cement meal. The dust nevertheless contained in the exhaust gas of the fluidised bed is separated from the gas in a separator and delivered back to the fluidised bed.

In comparison with WO 2008/059378, the use of a fluidised bed reactor, especially a fluidised bed operated in a stationary manner, makes recirculation of the exhaust gas superfluous. Therefore, it is no longer necessary to cool and re-heat the exhaust gas. Thus, markedly less dust is conveyed in the circuit and that dust is not cooled, or is cooled only slightly, so that, in comparison, markedly less CaO can recarbonate.

According to a special configuration of the calciner, the means for removing the precalcined raw cement meal can be constructed in the manner of a siphon.

The fluidised bed reactor itself preferably has a porous or perforated inflow base to which the means for delivering combustion air for gassing the inflow base are connected. The porous inflow base may also be formed by a layer of bulk material which can be delivered and removed by suitable means in order to replace or regenerate the layer of bulk material.

The dust contained in the exhaust gas of the calciner is separated off in a separator connected to the calciner and, if appropriate, delivered back to the fluidised bed. In order to improve the separation efficiency of the separator and/or in order to reduce the risk of blockages, the exhaust gas of the calciner can optionally be cooled directly by raw meal or by means of heat exchangers. The risk of cyclone blockage exists in particular owing to the high gas and material temperatures which are close to the melting point of the alkali salts in the case of calcination in an almost pure $CO_2$ atmosphere.

After the dust has been separated off and after any necessary dehumidification, the exhaust gas of the calciner is delivered to a $CO_2$ preparation device, especially a device for liquefaction.

The kiln exhaust gas conveyed through the preheater may possibly have an increased $SO_2$ content since the sulphur expelled in the kiln, or the fuel sulphur introduced by way of the kiln fuel, can no longer be bound into the material in the calciner. The kiln exhaust gas is therefore expediently delivered to a device for separating off $SO_2$. Furthermore, the kiln exhaust gas can be subjected to $CO_2$ washing and subsequent desorption before it is likewise delivered to a device for $CO_2$ liquefaction. It is also possible for the kiln exhaust gas subjected to $CO_2$ washing and desorption to be mixed with the calciner exhaust gas prior to the $CO_2$ liquefaction.

BRIEF DESCRIPTION OF THE DRAWINGS

Further advantages and configurations of the invention will be explained in more detail hereinafter by means of the description and the drawings.

In the drawings.

DETAILED DESCRIPTION OF THE ILLUSTRATIVE EMBODIMENTS

Figure 1:
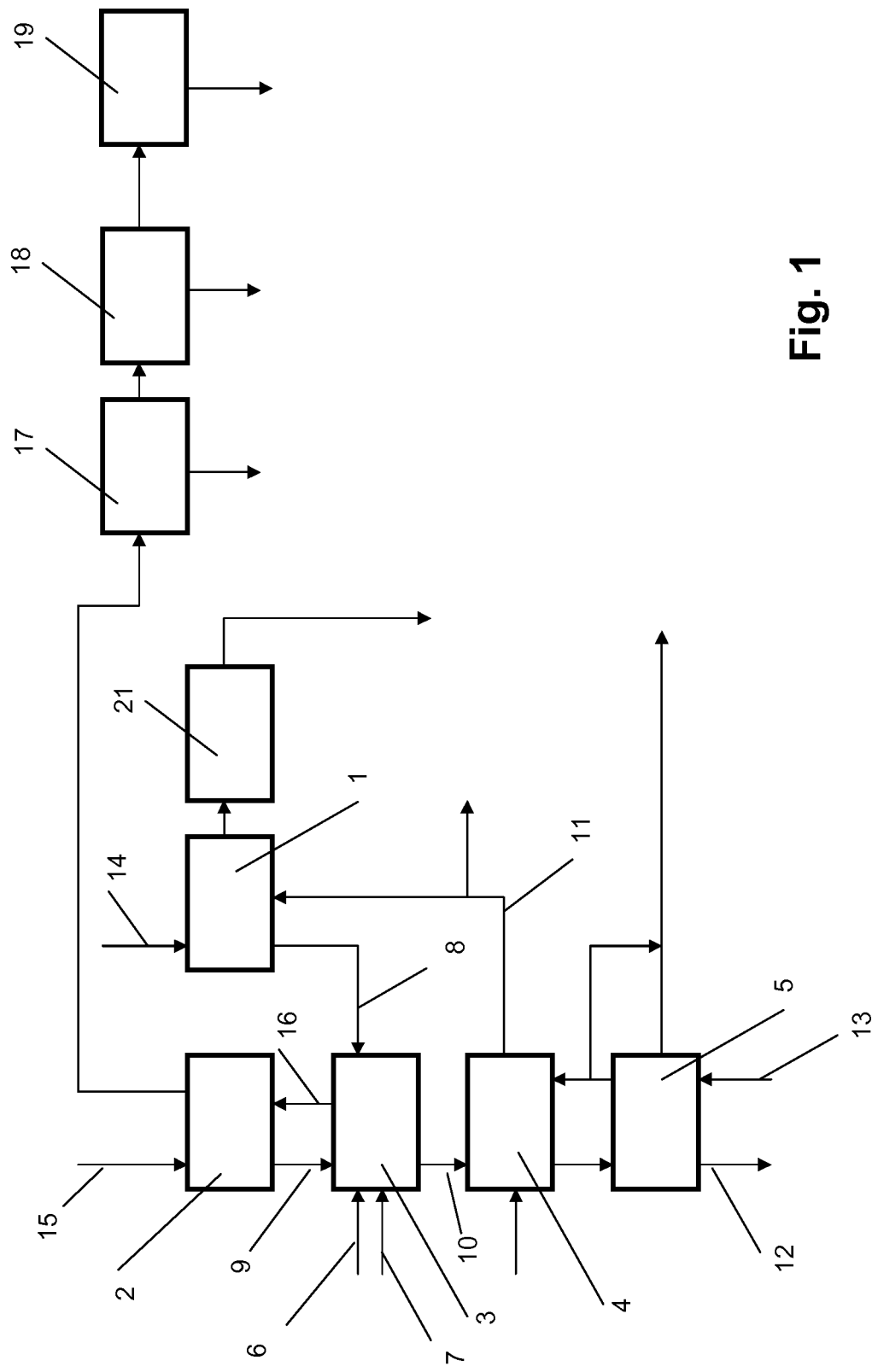
FIG. 1 shows a block diagram of a system for producing cement clinker according to a first embodiment.

The system shown in FIG. 1 for producing cement clinker basically comprises a first preheater 1, a second preheater 2, a calciner 3 and a kiln 4. A cooler 5 is also provided.

The calciner has means 6 for delivering fuel and means 7 for delivering combustion air having an oxygen content of at least 75 mol %, preferably at least 90 mol %, and also means 8, 9 for delivering preheated raw cement meal from the preheaters 1, 2.

The precalcined raw cement meal passes via a duct 10 into the kiln for burning the precalcined raw cement meal. The exhaust gas of the kiln is conveyed by way of a kiln exhaust gas duct 11 into the first preheater 1, bypassing the calciner 3.

The cement clinker burnt in the kiln is cooled in the downstream cooler 5 and removed as finished material 12. Some of the cooling air 13 employed in the cooler is used in the kiln as combustion air or is used for another form of heat processing.

Raw cement meal 14, 15 is delivered to the two preheaters 1, 2 and, when it has been preheated, it is delivered to the calciner 3 via the means 8 and 9. While the exhaust gas of the kiln 4 is used only in the first preheater, the exhaust gases of the calciner 3 pass by way of a calciner exhaust gas duct 16 into the second preheater 2. The exhaust gases of the calciner are therefore not mixed with the kiln exhaust gases.

The calciner 3 operates in accordance with the fluidised bed principle and does not receive kiln exhaust gas, but rather is acted upon by fuel and an oxygen stream which is enriched compared with ambient air. As a rule, the oxygen concentration is at least 75 mol %, preferably at least 90 mol %. With the fluidised bed principle, a markedly smaller volume flow is necessary compared with the entrained flow reactor because the raw meal has only to be fluidised and does not have to be conveyed pneumatically. Return of the calciner exhaust gases is therefore not necessary. Even at very low flow rates, solids concentrations of up to 200 kg/m$^3$ are established in the fluidised bed.

After the preheater 2, the calciner exhaust gas is delivered to a separator 17 for dust removal and to a device 18 for dehumidification before it passes into a $CO_2$ preparation device 19, especially a liquefaction device. After dust removal and dehumidification, the exhaust gas contains more than 90% carbon dioxide and after any necessary separation of trace substances, such as, for example, $SO_2$, it can be stored.

Figure 2:
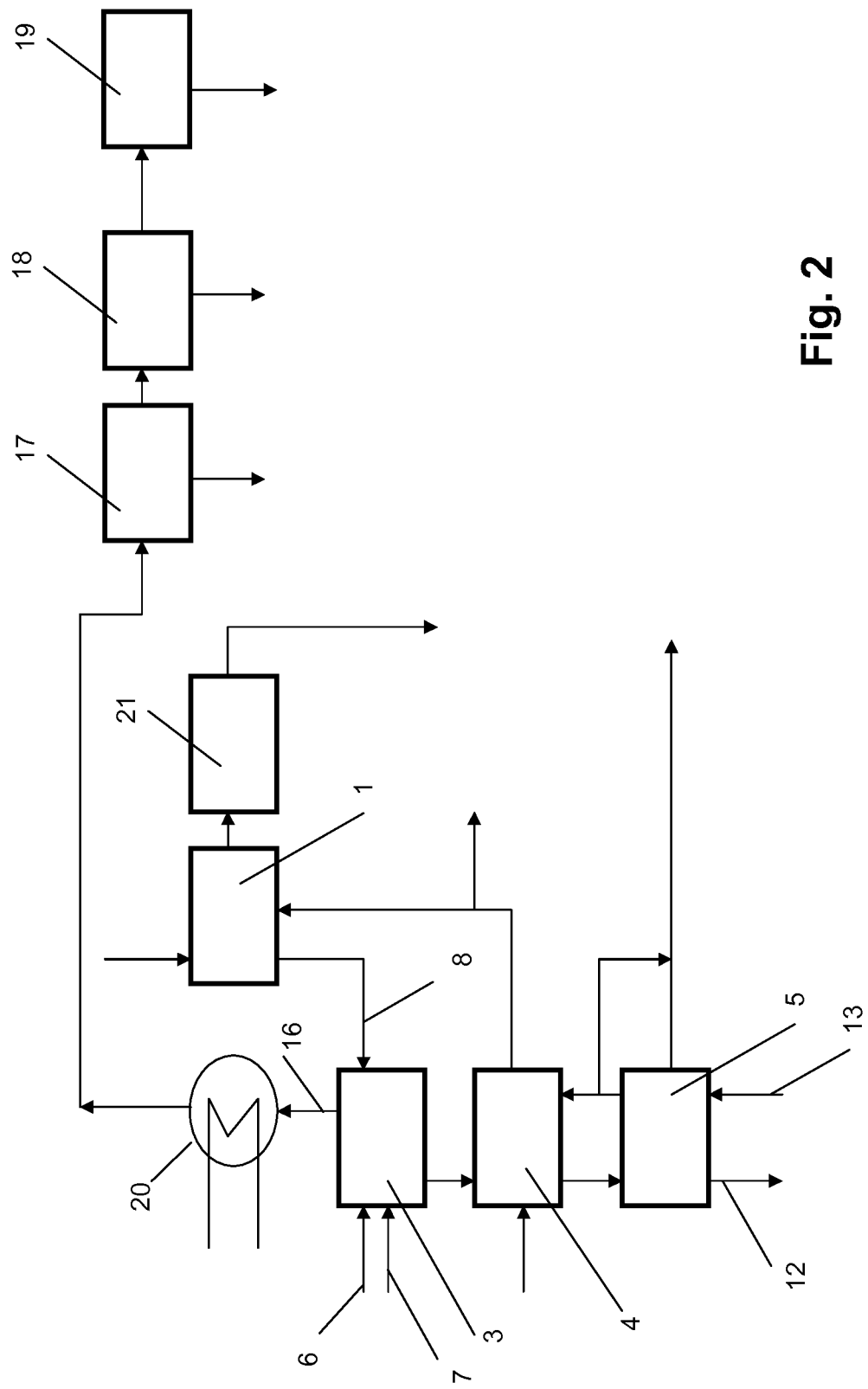
FIG. 2 shows a block diagram of a system for producing cement clinker according to a second embodiment.

In the second embodiment according to FIG. 2, a heat exchanger 20 instead of the second preheater is provided for cooling the calciner exhaust gas. Otherwise, in this case too, the exhaust gases of the kiln 4 are delivered to the preheater 1, bypassing the calciner 3.

Figure 3:
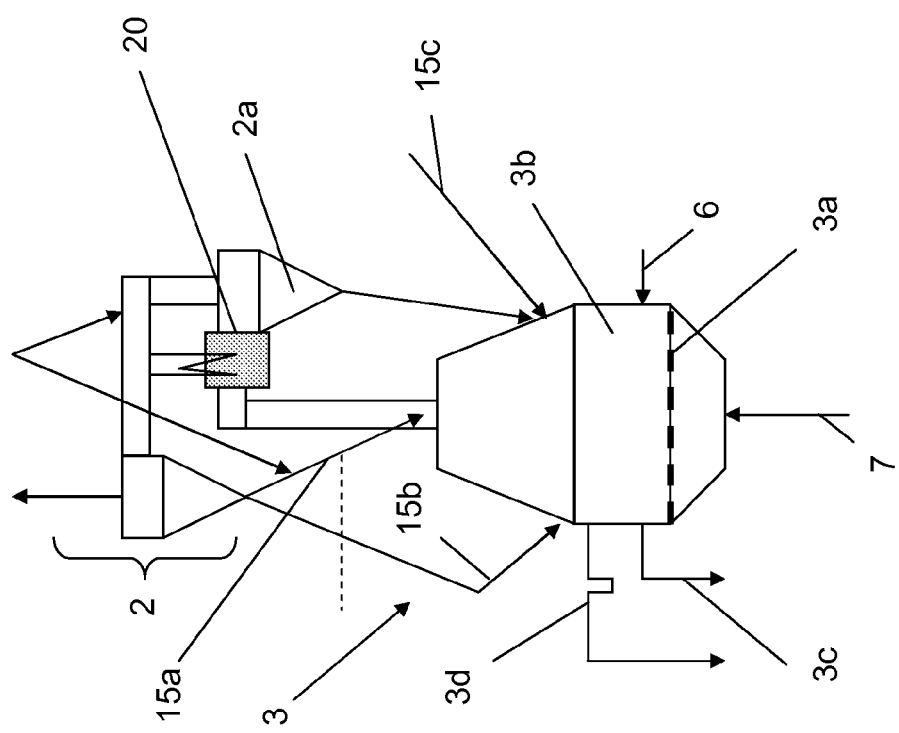
FIG. 3 is a schematic representation of the calciner according to a first variant.

The calciner 3 will be described in more detail hereinafter with reference to FIG. 3. It is constructed in the form of a fluidised bed reactor having a porous or perforated inflow base 3a, the fluidisation of the fluidised bed of preheated raw cement meal with the combustion air taking place via the means 7 for delivering the combustion air. The fuel is delivered via the means 6 into the hot operating fluidised bed 3b where combustion with the oxygen-containing combustion air takes place. The raw cement meal deacidified by means of the thermal energy released is transported out of the fluidised bed 3b in the underfloor or overflow 3c, 3d and introduced into the kiln 4. The means for removing the precalcined raw cement meal may be constructed in the form of a siphon. The fluidised bed 3b is preferably operated in such a manner that it is in a stationary state and not in a circulating state, that is to say, flow through the fluidised bed reactor takes place at rates which are substantially below the discharge rate for the precalcined raw cement meal. The dust nevertheless contained in the exhaust gas of the fluidised bed is separated off in a cyclone 2a of the following preheater 2 and delivered back to the fluidised bed. In order to improve the separation efficiency of the cyclone 2a and/or in order to reduce the risk of cyclone blockages, the calciner exhaust gas of the fluidised bed can optionally be cooled directly with raw meal 15a from the preheater 2 or by means of a heat exchanger 20. In addition, the preheated raw meal 15b, 15c from the heat exchanger or from the two heat exchangers is delivered to the fluidised bed and is there deacidified almost completely.

Figure 4:
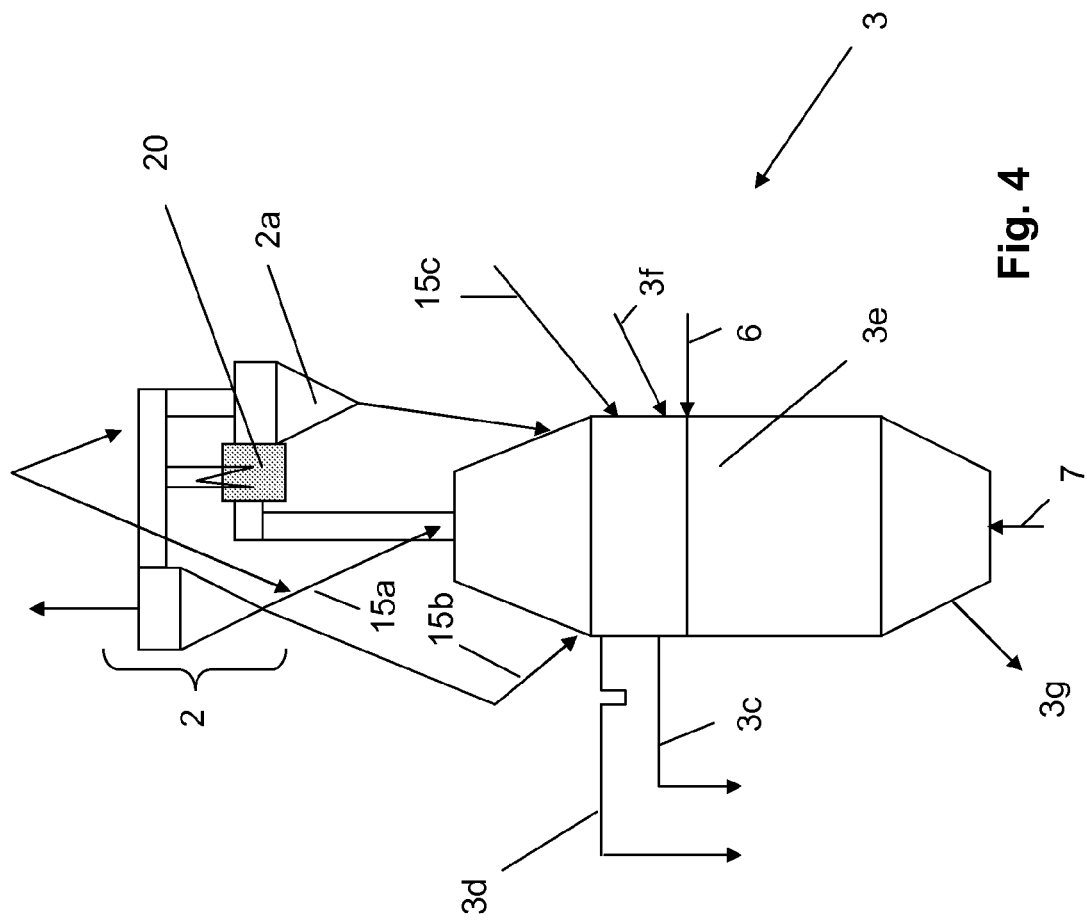
FIG. 4 is a schematic representation of the calciner according to a second variant and FIG. 5 is a block diagram of a system for producing cement clinker according to a third embodiment.

FIG. 4 shows a variant of the calciner 3 in which the inflow base is formed by a layer of bulk material 3e, preferably composed of comminuted cement clinker. Otherwise, the mode of operation is identical to the embodiment described in FIG. 3. There are merely provided means 3f and 3g for delivering and removing the bulk material layer 3e for the purpose of replacing or regenerating the bulk material layer.

Although the two calciners are shown in combination with the second preheater 2, it is also possible merely to provide a heat exchanger, as shown, for example, in FIG. 2, instead of the preheater.

After the preheater 1, the kiln exhaust gases are usually delivered to a separator 21 for dust removal. Since the kiln exhaust gas is no longer conveyed through the calciner 3, substantially reduced sulphur binding into the cement clinker and consequently substantially higher $SO_2$ emissions are to be expected.

Figure 5:
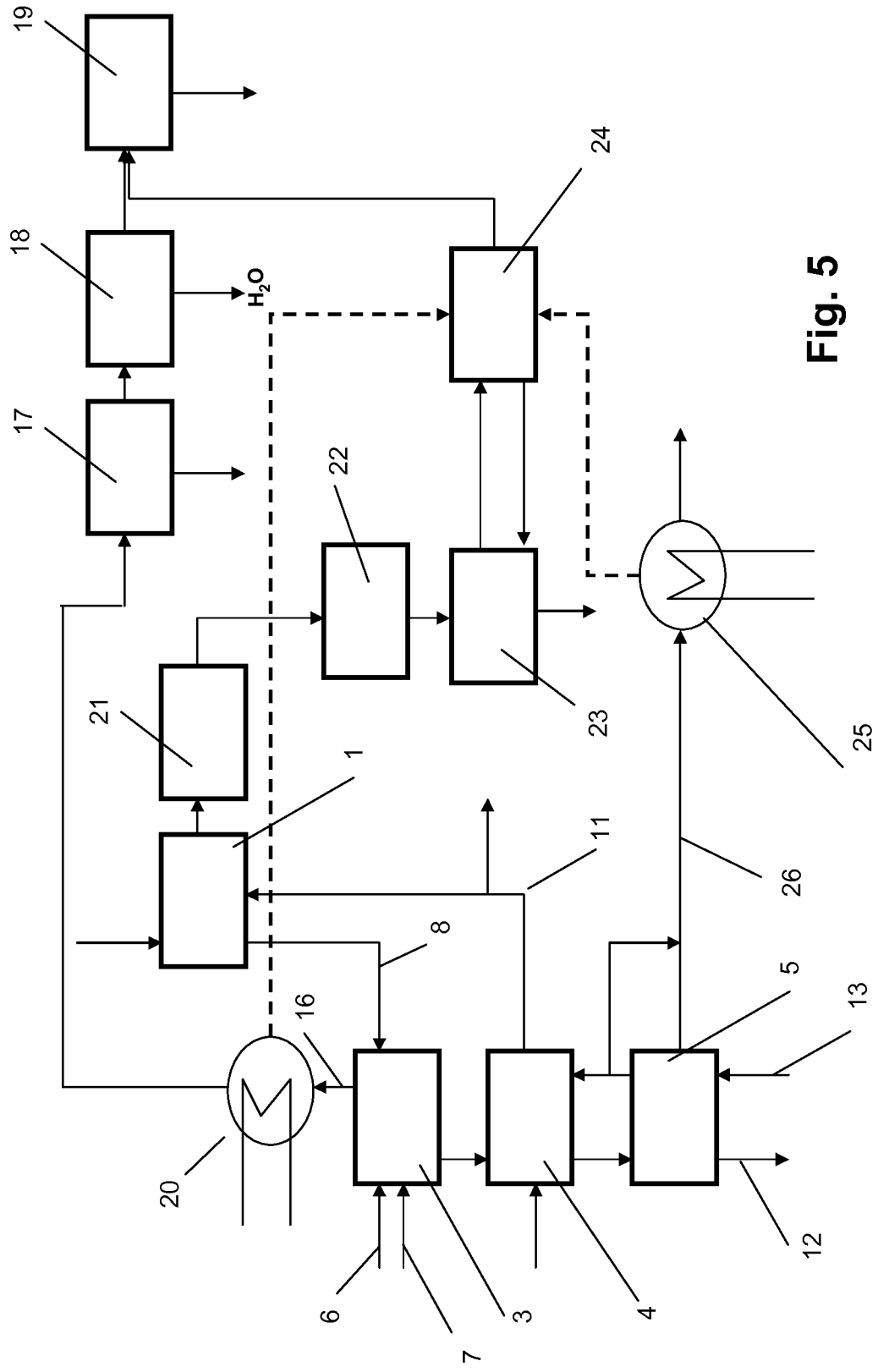

The embodiment according to FIG. 5 therefore demonstrates a possibility in which the kiln exhaust gas is further treated both with regard to the $SO_2$ and with regard to the $CO_2$ content. Thus, after the separator 21, a device 22 for separating off $SO_2$ is provided.

In order further to improve $CO_2$ separation, $CO_2$ washing can then be provided for in a device 23 and, subsequently, desorption can be provided for in a device 24. A suitable absorption agent is, for example, monoethanolamine. Advantageously, the heat of the heat exchanger 20 and/or of a heat exchanger 25, which harnesses heat from the exhaust air stream 26 of the cooler, can be used for the necessary regeneration of the absorption agent. The remaining $CO_2$-containing gas can then likewise be delivered to a liquefaction stage, advantageously being combined beforehand with the dehumidified calciner exhaust gas, as shown in FIG. 5.

The prepared, especially liquefied, $CO_2$ can then be stored in a suitable manner or used in some other manner. With the system described above, a $CO_2$ concentration with a purity of more than 95% can be achieved, so that transport and storage can be effected in an economical manner.

The invention claimed is:

1. An apparatus for producing cement clinker comprising:
   a. a first preheater for preheating raw cement meal, and a second preheater for preheating raw cement meal,
   b. a calciner in the form of a fluidized bed reactor, said calciner precalcining the preheated raw cement meal, said calciner having means for delivering fuel, means for delivering combustion air having an oxygen content of at least 75 mol % and means for delivering preheated raw cement meal, said calciner having a calciner exhaust gas duct connected to said second preheater and delivering exhaust gases of the calciner to the second preheater, said second preheater connected to a CO2 preparation device and delivering the exhaust gases of the calciner to the CO2 preparation device, and
   c. a kiln burning precalcined raw cement meal, said kiln having a kiln exhaust gas duct connected to said first preheater and bypassing said calciner to deliver the kiln exhaust gases occurring in the kiln into the first preheater to directly contact the contents of the first preheater
   characterised in that said calciner has means for removing precalcined raw cement meal, said means for removing precalcined raw cement meal being arranged below an expansion point of said fluidised bed reactor and being connected to said kiln,
   characterised in that said calciner has a porous or perforated inflow base to which is connected said means for delivering combustion air.

2. Apparatus according to claim 1, characterised in that said CO2 preparation device comprises a device for CO2 liquefaction.

3. Apparatus according to claim 1, characterised in that said calciner has means for removing the precalcined raw cement meal, said means being constructed in the form of a siphon.

4. Apparatus according to claim 1, characterised in that said porous inflow base is formed by a bulk material layer.

5. Apparatus according to claim 4, further comprising means for delivering said bulk material layer and means for removing said bulk material layer.

6. Apparatus according to claim 1, characterised in that said calciner is connected to at least one separator for dust removal.

7. Apparatus according to claim 6, further comprising a cooler for cooling calciner exhaust provided between said calciner and said separator.

* * * * *